UNITED STATES PATENT OFFICE.

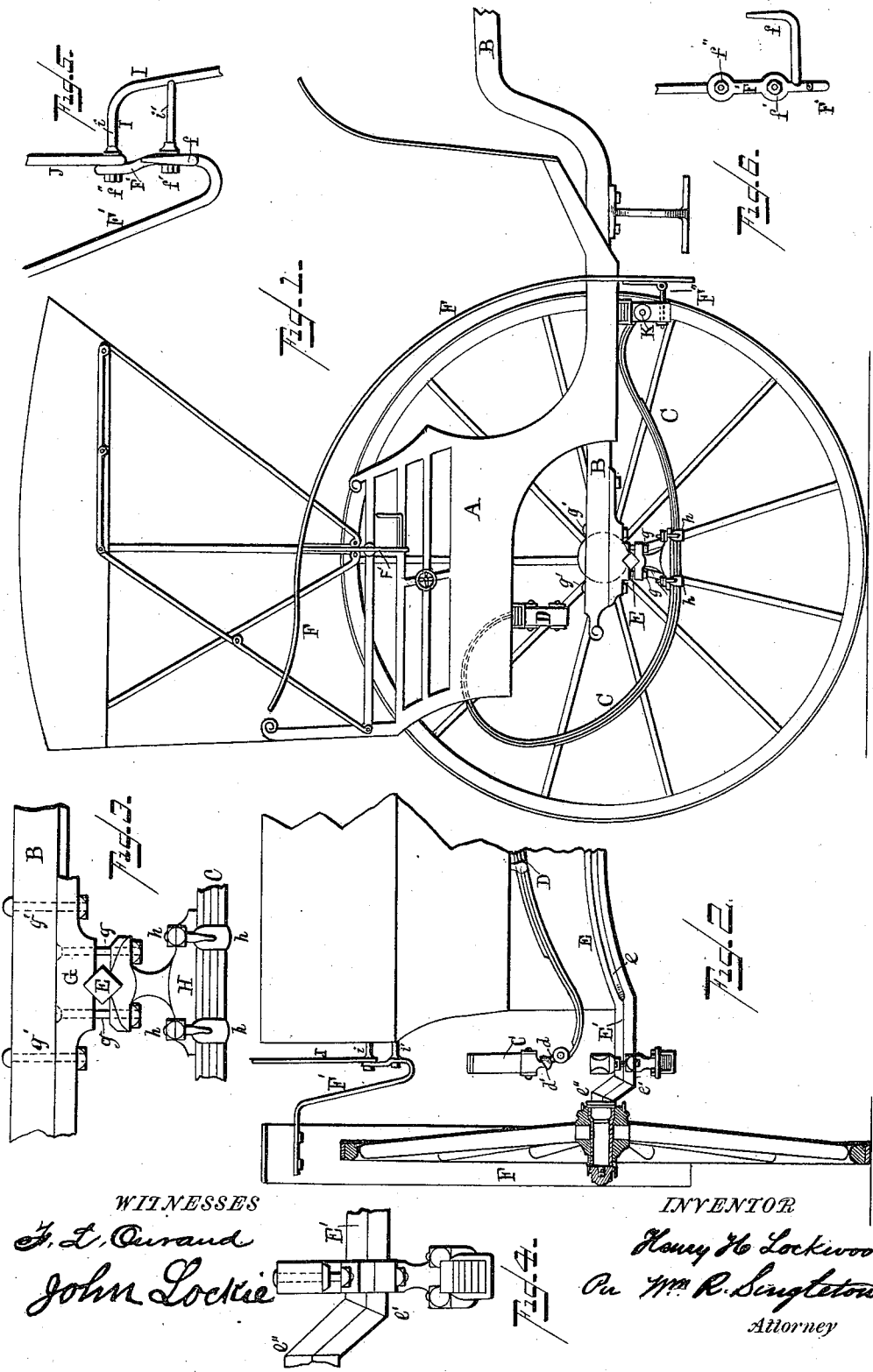

HENRY H. LOCKWOOD, OF OLEAN, NEW YORK.

TWO-WHEELED VEHICLE.

SPECIFICATION forming part of Letters Patent No. 430,190, dated June 17, 1890.

Application filed February 13, 1890. Serial No. 340,292. (No model.)

*To all whom it may concern:*

Be it known that I, HENRY H. LOCKWOOD, a citizen of the United States, residing at Olean, in the county of Cattaraugus and State of New York, have invented certain new and useful Improvements in Wheeled Vehicles; and I do hereby declare the following to be a full, clear, and exact description of the invention, such as will enable others skilled in the art to which it appertains to make and use the same.

This invention relates to certain improvements in vehicles, which will be hereinafter more particularly described and pointed out.

In the accompanying drawings, forming part of this specification, Figure 1 is a side elevation of a vehicle with the improvements. Fig. 2 is an end view of one-half of Fig. 1. Figs. 3, 4, 5, and 6 are details of separate parts enlarged.

A represents the body of a phaeton.
B are the shafts.
C C are the side springs.
D is the cross-spring.
E is the wheel-axle.
F is the wheel or mud-fender.
F' is the support of the upper end of the fender F, and F'' the support at the lower end.
$f$ is the lamp-holder.
G is the shaft-holder, which rests upon the axle E, and the shafts B are held by the screw-bolts $g'\ g'$.
H is the spring-holder, and is secured to the shaft-holder G by bolts $g\ g$.
The spring C is held by the clips $h\ h$.
The axle E is constructed in the following manner: The middle part is either round or square. The parts E' are square, but are placed diagonally or diamondwise to the vertical and horizontal lines, as shown in Figs. 2 and 3. The object of this construction is to obtain the maximum strength of any given size of axle. The part $e$ has the corners truncated to form an easement between the parts E and E'. That part from $e'$ to $e''$ is bent at an angle of about forty-five degrees to lower the axle from the center of the wheel-hub about from two to four inches, as may be desired. The mud or wheel fender F is sustained near the upper end by a brace-rod F', attached to the goose-neck forging I by means of two bolt-holes $f'$ and $f''$, which fit the branches $i$ and $i'$ of the goose-neck I.

J is the center bow-socket, which is held by the upper part $i$ of the goose-neck.

Heretofore the goose-neck has had but one branch, as $i$, to sustain the bow-socket and the fender-brace. I have found that by the introduction of the lower branch $i'$ to the goose-neck there is great strength added to the brace F', and it has made a great improvement in this part of the vehicles where it is used. Connected to the brace F' is a branch $f$ for the support of the lamp.

The cross-spring D is fastened under the body of the vehicle at the middle, and its ends are attached to the upper ends of the side springs C, as shown in Fig. 2, by means of stirrups $d$, having a ball-and-socket or universal joint $d'$.

The lower end of fender-brace F' is supported by a standard F'', attached to the front cross-spring K, as shown in Fig. 1.

I claim—

1. The combination of the spring C, the spring-holders H, the shafts B, the shaft-holders G, the axle E, having its ends between the holders G and H, and the bolts $g$, securing the two holders together, as set forth.

2. The wheel or mud fender supported at its upper end by a brace attached to the goose-neck by two bolts $f'\ f''$, and at its lower end by the device F'', connected to the joint $d$ at the end of the front cross-spring K, as set forth.

In testimony whereof I affix my signature in presence of two witnesses.

HENRY H. LOCKWOOD.

Witnesses:
  WM. R. SINGLETON,
  M. TRIMBLE.